US012583633B2

(12) United States Patent (10) Patent No.: US 12,583,633 B2
Shiba (45) Date of Patent: Mar. 24, 2026

(54) UNAUTHORIZED READOUT PREVENTION MECHANISM AND UNMANNED VEHICLE

(71) Applicant: NEC Corporation, Tokyo (JP)

(72) Inventor: Hisashi Shiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 116 days.

(21) Appl. No.: 18/589,506

(22) Filed: Feb. 28, 2024

(65) Prior Publication Data

US 2024/0327043 A1 Oct. 3, 2024

(30) Foreign Application Priority Data

Mar. 28, 2023 (JP) ................................. 2023-050738

(51) Int. Cl.
*B64U 20/80* (2023.01)
*G06F 21/10* (2013.01)
*G11B 20/00* (2006.01)
(52) U.S. Cl.
CPC .......... *B64U 20/80* (2023.01); *G06F 21/109* (2023.08); *G11B 20/00666* (2013.01); *G06F 2221/2143* (2013.01)

(58) Field of Classification Search
CPC ................... B64U 20/80; G06F 21/109; G06F 2221/2143; G06F 21/86; G11B 20/00666
USPC ........................................................ 307/9.1
See application file for complete search history.

(56) References Cited

U.S. PATENT DOCUMENTS 9,183,381 B2 * 11/2015 Morris .................... G06F 21/55
2022/0035384 A1 * 2/2022 Subramanian ....... G08B 29/188

FOREIGN PATENT DOCUMENTS

JP 2001-505015 A 4/2001
JP 5052287 B2 10/2012
JP 6799900 B2 12/2020

* cited by examiner

*Primary Examiner* — Richard Tan
(74) *Attorney, Agent, or Firm* — Sughrue Mion, PLLC

(57) ABSTRACT

An unauthorized readout prevention mechanism includes a power source unit provided outside a casing provided in an unmanned vehicle, a power line for supplying power from the power source unit to a volatile region inside the casing, an opening-closing unit provided in the casing, and a switch that physically separates the power line and shuts off supply of power to inside the casing when the opening-closing unit is opened.

10 Claims, 7 Drawing Sheets

A

B

UNAUTHORIZED READOUT PREVENTION MECHANISM AND UNMANNED VEHICLE

CROSS-REFERENCE TO RELATED APPLICATION

This application is based upon and claims the benefit of priority from Japanese patent applications No. 2023-050738, filed on Mar. 28, 2023, the disclosure of which is incorporated herein in its entirety by reference.

BACKGROUND OF THE INVENTION

1. Field of the Invention

The present disclosure relates to an unauthorized readout prevention mechanism for preventing unauthorized readout and to an unmanned vehicle.

2. Background Art

Unmanned aerial vehicles are equipped with a computer system for executing information processing such as signal processing, image processing and communication processing, for example. However, if an unmanned aerial vehicle is seized, malicious actors may steal data, programs, circuit information and the like that are inside the computer system. In view of this, methods for preventing theft of data, programs, circuit information and the like have been disclosed.

As related art, Patent Document 1 (Japanese Patent No. 5052287) discloses a method that involves encrypting data and programs. Also, as related art, Patent Document 2 (Japanese Patent No. 6799900) and Patent Document 3 (Japanese Unexamined Patent Application Publication No. 2001-505015) disclose methods for erasing data and programs in the case where a preset anomaly is detected, or where an instruction is received from outside, or where a preset environmental condition is satisfied. Furthermore, Patent Document 3 discloses a method for not only erasing data and programs but also destroying the computer system installed in the unmanned vehicle by means of an explosion.

However, with the encryption disclosed in Patent Document 1, data and programs may be extracted by hacking techniques such as power analysis attacks and reverse engineering, replication techniques and the like, for example. Furthermore, data and programs may be extracted by password cracking or leakage.

Also, with the methods disclosed in Patent Documents 2 and 3, if there is a glitch in the apparatus or processing for erasing data and programs, or if power is cut off before or during processing, data and programs will not be erased and will remain in the computer system. For example, in the case where an unmanned aerial vehicle is attacked and crashes, programs and data will be extracted when power is interrupted before the processing for erasing the data and programs is executed, or when the apparatus for erasing or destroying the data and programs is itself destroyed.

SUMMARY OF THE INVENTION

An example object of the present disclosure is to erase circuit information, programs and data from a computer system installed in an unmanned vehicle and prevent extraction thereof.

In order to achieve the example object described above, an unauthorized readout prevention mechanism according to an example aspect includes:

a power source unit provided outside of a casing provided in an unmanned vehicle;

a power line configured to supply power from the power source unit to a volatile region inside the casing;

an opening-closing unit provided in the casing; and a switch configured to physically separate the power line and shut off supply of power to inside the casing when the opening-closing unit is opened.

In order to achieve the example object described above, an unmanned vehicle according to an example aspect includes:

a power source unit provided outside of the casing;

a power line configured to supply power from the power source unit to a volatile region inside the casing;

an opening-closing unit provided in the casing; and a switch configured to physically separate the power line and shut off supply of power to inside the casing when the opening-closing unit is opened.

According to the present disclosure as described above, circuit information, programs and data can be erased from a computer system installed in an unmanned vehicle and extraction thereof can be prevented.

EXEMPLARY EMBODIMENT

Figure 1:
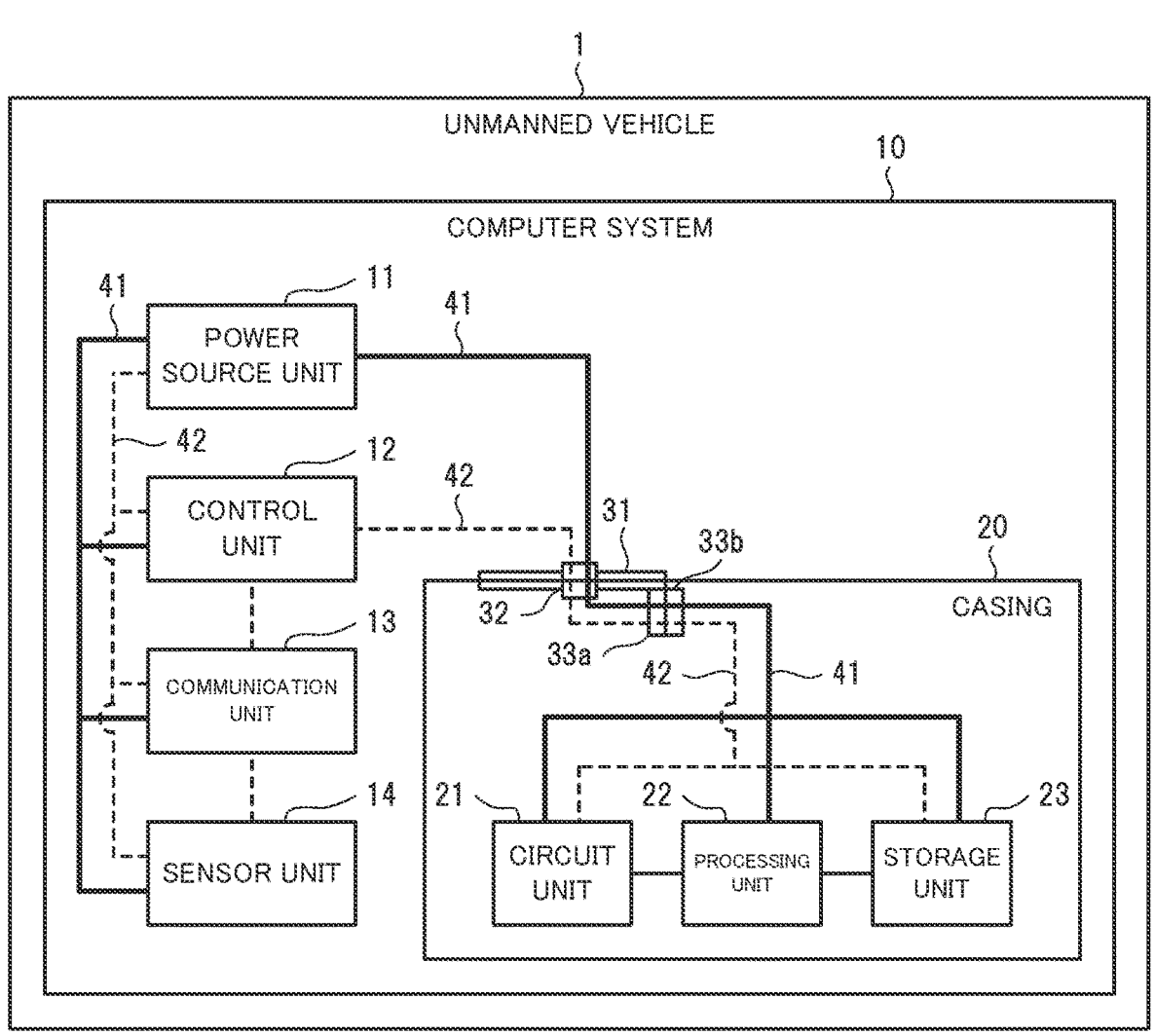
FIG. 1 is a diagram for describing an example of an unmanned vehicle.

Hereinafter, an example embodiment will be described with reference to the drawings. Note that, in the drawings described below, elements having same functions or corresponding functions will be denoted by the same reference numerals, and the repetitive description may also be omitted.

Example Embodiment

The configuration of an unmanned vehicle in an example embodiment will be described, using FIG. 1. FIG. 1 is a diagram for describing an example of an unmanned vehicle. [Apparatus Configuration]

An unmanned vehicle 1 shown in FIG. 1 has a mechanism that erases circuit information, programs (software), data and the like inside a computer system installed in the unmanned vehicle 1 in the event of the unmanned vehicle 1 being seized, and ensures that the circuit information and the like cannot be extracted by malicious actors.

The unmanned vehicle will now be described.

The unmanned vehicle 1 is, for example, a moving body such as an unmanned aerial vehicle, an unmanned ground vehicle, an unmanned underwater vehicle or an unmanned surface vehicle. The unmanned vehicle 1 is, however, not limited to the above-described moving body. Note that the unmanned vehicle 1 has a computer system 10 internally.

Normal operations of the unmanned vehicle will now be described.

The unmanned vehicle 1 is powered on at a base or the like, with an opening-closing unit 31 of a casing 20 closed. At this point in time, power may be supplied from outside the unmanned vehicle 1.

Next, circuit information is sent to a circuit unit 21 inside the casing 20 of the unmanned vehicle 1 from outside the unmanned vehicle 1, using wireless or wired communication, and a circuit is constructed. Next, after being started, a processing unit 22 is sent a program and starts processing. Next, any necessary data is transmitted to a storage unit 23 and stored beforehand.

Next, the unmanned vehicle 1 flies, travels or navigates in accordance with preset rules or autonomously, communicates with other unmanned vehicles, manned vehicles and facilities such as the base, in accordance with preset rules or autonomously, and transmits and receives circuit information, programs, data and the like as necessary.

Also, the unmanned vehicle 1 senses the surroundings in accordance with preset rules or autonomously, saves the processing results thereof to the storage unit 23, updates an action plan based on the processing results as necessary, and updates how the unmanned vehicle 1 flies, travels or navigates via the control unit 12. Also, the unmanned vehicle 1 transmits the processing results to other unmanned vehicles, manned vehicles, the base and the like via a communication unit 13 as necessary.

Next, the unmanned vehicle 1 returns to the base when its mission ends, and causes untransmuted data to be stored in a database of the base or the like as necessary using wireless or wired communication. Next, when necessary processing ends, power is cut off and the circuit information, programs and data are cleared.

The case where the unmanned vehicle is seized by an unexpected third party will now be described. For example, in the case where the unmanned vehicle 1 is an unmanned aerial vehicle that is attacked and crashes, the circuit information, programs and data are erased, as a result of the power source being destroyed due to the impact of the crash and power being cut off. Thus, after seizing the unmanned vehicle 1, the unexpected third party is unable to obtain the circuit information, programs or data.

Next, in the case where the unmanned vehicle 1 is an unmanned ship or an unmanned submersible that is attacked and sinks, for example, the circuit information, programs and data are erased due to the power source inevitably being short-circuited by seawater or the like and power being cut off. Thus, after seizing the unmanned vehicle 1, the unexpected third party is unable to obtain the circuit information, programs or data.

Next, in the case where the unmanned vehicle 1 is an unmanned driving vehicle that is attacked and stops travelling, for example, the circuit information, programs and data are erased, as a result of the power source being destroyed due to the impact of the attack and power being cut off. Thus, after seizing the unmanned vehicle 1, the unexpected third party is unable to obtain the circuit information, programs or data.

Next, in the case where the power source system is not destroyed at the time that the unmanned vehicle 1 is seized, a power line 41 or the power line 41 and a signal line 42 are separated when the unexpected third party opens the opening-closing unit 31 of the casing 20 of the unmanned vehicle 1, and power is no longer supplied to inside the casing 20, thus resulting in the circuit information, programs and data that are stored in the memory of a volatile region being erased.

The power line 41 is an electric wire for supplying power from the power source unit 11 to the volatile region inside the casing 20. The signal line 42 is an electric wire for the control unit 12 to communicate with devices inside the casing 20.

In this way, in the event of the opening-closing unit 31 being opened, power is no longer supplied to inside the casing 20, and thus it is possible to ensure that an unexpected third party is unable to obtain the circuit information, programs or data stored in the memory of the volatile region.

The configuration of the unmanned vehicle will now be described.

A computer system 10 is a system for controlling movement of the unmanned vehicle 1. Also, the computer system 10 is provided inside an outer shell structure (outer shell casing) of the unmanned vehicle 1. Note that, in the example in FIG. 1, devices other than the computer system 10 (e.g., various mechanisms and circuits necessary for movement of the unmanned vehicle 1) are not illustrated, but the computer system 10 also controls those various devices.

The computer system 10 includes a power source unit 11, a control unit 12, the communication unit 13, a sensor unit 14, the circuit unit 21, the processing unit 22 and the storage unit 23. Note that the circuit unit 21, the processing unit 22 and the storage unit 23 are provided in the casing 20.

The power source unit 11 is provided outside the casing 20 provided in the unmanned vehicle 1. The power source unit 11 supplies power to various devices installed in the unmanned vehicle 1, such as the control unit 12, the communication unit 13, the sensor unit 14, the circuit unit 21, the processing unit 22 and the storage unit 23 via the power line 41 (bold line). The power source unit 11 is, for example, a battery, an internal combustion engine generator or the like. Note that the power source unit 11 may also be a nuclear power generator.

The control unit 12 controls movement such as flight, travel and navigation of the unmanned vehicle 1. The control unit 12 controls the unmanned vehicle 1 by receiving instructions from the circuit unit 21 and the processing unit 22 provided inside the casing 20 which will be described later, via the signal line 42 (dashed line). The storage unit provided in the control unit 12 does, however, not store highly confidential control information or the like.

The control unit 12 is, for example, a programmable device such as a CPU (Central Processing Unit) or a FPGA (Field-Programmable Gate Array), a GPU (Graphics Processing Unit), a circuit equipped with one or more thereof, a computer, or the like. Note that the control unit 12 may be constituted by a controller, a sequencer or the like.

In the case where the unmanned vehicle 1 is an unmanned aerial vehicle, the control unit 12 controls a rudder, rotation of a propeller for propulsion, adjustment of orientation and the like, for example. Also, in the case where the unmanned vehicle 1 is an unmanned underwater vehicle or an unmanned surface vehicle, the control unit 12 controls a thruster, rotation of a screw for propulsion, adjustment of orientation, and the like, for example. Also, in the case where the 10) unmanned vehicle 1 is an unmanned ground vehicle, the control unit 12 controls an engine, a motor, brakes, an accelerator, transmission gears, adjustment of orientation, and the like, for example.

Also, the communication unit 13 communicates with a communication unit provided in an external device (e.g., device for operating the unmanned vehicle 1) provided externally to the unmanned vehicle 1. The communication unit 13 communicates with the external device by receiving instructions from the circuit unit 21 and the processing unit 22 provided inside the casing 20 which will be described later.

Also, the communication unit 13 may have a computer internally. Highly confidential communication information, such as an encryption key for encrypted communication, and communication protocols, is, however, not stored in the storage unit of the computer of the communication unit 13.

The sensor unit 14 senses the surrounding environment of the unmanned vehicle 1. The sensor unit 14 senses other unmanned vehicles, manned vehicles, people and the like. The sensor unit 14 is a sensor device such as a camera, an infrared sensor, a radar, a LiDAR (Light Detection and Ranging) sensor and a sonar (Sound Navigation and Ranging), for example.

The sensor unit 14 transmits data that has been sensed (sensing data) to inside the casing 20 described later. The transmitted data is used in the circuit unit 21 and the processing unit 22 inside the casing 20.

Also, the sensor unit 14 may have a computer internally. Highly confidential sensing data is, however, not stored in the storage unit of the computer of the sensor unit 14.

Furthermore, the external environment may be sensed using a camera, various sensors or the like, and the sensing data may be transmitted to the base or the like. If communication with the unmanned vehicle 1 is interrupted, the base is able to know what happened from the situation immediately before the interruption.

The circuit unit 21 is installed inside the casing 20. The circuit unit 21 receives data transmitted from the control unit 12, the communication unit 13 and the sensor unit 14 outside the casing 20, and executes predetermined processing using the received data. Also, the circuit unit 21 transmits the processing results to the control unit 12, the communication unit 13 and the sensor unit 14. Furthermore, the circuit unit 21 stores necessary data from among the received data in the storage unit 23. The data stored in the storage unit 23 is, for example, data that is utilized in processing by the circuit unit 21.

Also, the circuit unit 21 executes processing that requires dedicated hardware, such as processing with high real-time performance. The circuit unit 21 is configured using a programmable device such as an FPGA based on a SRAM (Static Random Access Memory), which is a volatile memory, for example.

Note that the circuit information for constructing a circuit in the FPGA is stored in the SRAM, but since the SRAM is volatile, the circuit information is lost when power is interrupted.

The processing unit 22 is installed inside the casing 20. The processing unit 22 receives data transmitted from the control unit 12, the communication unit 13 and the sensor unit 14 that are provided outside the casing 20, and executes predetermined processing using the received data. Also, the processing unit 22 transmits the processing results to the control unit 12, the communication unit 13 and the sensor unit 14. Furthermore, the processing unit 22 stores necessary data from among the received data in the storage unit 23. The data stored in the storage unit 23 is, for example, data that is utilized in processing by the circuit unit 21.

Also, the processing unit 22 executes processing or the like that does not have a high real-time requirement. For example, the processing unit 22 is hardware constituted by a CPU and a DRAM (Dynamic Random Access Memory). Programs (software) such as general signal processing, control processing and communication processing are stored in the DRAM of the processing unit 22. For example, in the case where the OS (Operating System) is Linux®, a file-system such as tmpfs (temporary file storage) or ramfs (random access memory file system) is configured on the DRAM. It is conceivable to hold the programs on the DRAM.

Note that since the DRAM is volatile, the stored programs are lost when power is interrupted.

The storage unit 23 is installed inside the casing 20. The storage unit 23 stores data necessary for the above-described processing, data representing the processing results of the circuit unit 21 and the processing unit 22, and the like, for example. Also, the circuit unit 21 and the processing unit 22 refer to the data stored in the storage unit 23 and the like.

At startup, the storage unit 23 may transfer data from outside the casing 20 and store the data. The storage unit 23 is constituted by a DRAM or a SRAM, for example. For example, in the case where the OS is Linux®, a filesystem such as tmpfs or ramfs is configured on the DRAM or SRAM. It is conceivable to store the data on the DRAM or the SRAM.

Note that since the DRAM and SRAM are volatile, stored data is lost when power is interrupted.

The circuit unit 21, the processing unit 22 and the storage unit 23 are housed inside the casing 20. The casing 20 is provided with an unauthorized readout prevention mechanism constituted by the opening-closing unit 31 (opening-closing mechanism), a connector 32 and a switch 33.

The casing 20 is manufactured using a material that is not easily cut or pierced, in order to ensure that the inside of the casing 20 cannot be accessed except through the opening-closing unit 31. The material is conceivably a titanium alloy, for example.

The mechanism for preventing unauthorized readout will now be described.

The opening-closing unit 31 is an opening-closing mechanism provided in order to access the circuit unit 21, the processing unit 22 and the storage unit 23 from outside. The opening-closing unit 31 is a hatch, for example. The opening-closing unit 31 is, however, not limited to a hatch. Note that the opening-closing unit 31 may be an opening-closing unit that is opened by vibration of a certain intensity or more. The opening-closing unit 31 is, for example, conceivably a mechanism that is closed by a magnet and opens with a certain amount of force, or a mechanism that automatically rotates when vibration is applied and a claw is disengaged.

The connector 32 is a connection mechanism for connecting the power line 41 (bold line) and the signal line 42 (dashed line) outside the casing 20 with the power line 41 (bold line) and the signal line 42 (dashed line) inside the casing 20.

The connector 32, however, need not be provided. In that case, a hole (access hole) for passing the power line 41 and the signal line 42 through is formed in the casing 20 and the power line 41 and the signal line 42 are passed through the access hole.

The switch 33 is provided inside the casing 20. When the opening-closing unit 31 is opened, the switch 33 physically separates the power line 41 and shuts off supply of power to inside the casing 20.

Also, the switch 33 is constituted by connection units 33*a* and 33*b*. When the opening-closing unit 31 is opened, the connection unit 33*a* and the connection unit 33*b* of the switch 33 are physically separated (disconnected), and the power line 41 and signal line 42 outside the casing 20 and the power line 41 and signal line 42 inside the casing 20 are no longer electrically connected. A configuration may, however, be adopted in which only the power line 41 is physically separated (disconnected).

Accordingly, because power is interrupted, the circuit information necessary in order to construct the circuit unit 21, which is stored in the SRAM (volatile memory) of the circuit unit 21, is lost. Also, due to the power interruption, the programs that are used by the processing unit 22, which are stored in the DRAM (volatile memory) of the processing unit 22, are also lost. Furthermore, the data that is stored in the DRAM and SRAM of the storage unit 23 is also lost.

The connection unit 33*a* (first connection unit) is disposed on the inside of the casing 20 of the opening-closing unit 31. The power line 41 and signal line 42 inserted inside the casing 20 are connected to the connection unit 33*a* via the connector 32. A configuration may, however, be adopted in which only the power line 41 is connected.

The connection unit 33*b* (second connection unit) is disposed on the inside of the casing 20. The power line 41 and signal line 42 connected to the circuit unit 21, the processing unit 22 and the storage unit 23 inside the casing 20 are connected to the connection unit 33*b*. A configuration may, however, be adopted in which only the power line 41 is connected.

Note that, in the diagrams of the embodiment, the power line is simply referred to as the power line 41 in order to simplify description, but there are cases where the power line 41 not only supplies one type of power (voltage, current) but actually supplies a plurality of types of power, in which case a plurality of power lines are provided.

Also, in the diagrams of the embodiment, the signal line is simply referred to as the signal line 42 in order to simplify description, but there are cases where the signal line 42 not only uses one type of signal but actually utilizes a plurality of types of signals, in which case a plurality of signal lines are provided.

Structures of the connection units 33*a* and 33*b* will now be described.

In the case where the opening-closing unit 31 is a hatch, the connection units 33*a* and 33*b* have a structure whereby the power line 41 or the power line 41 and signal line 42 are separated (connection is electrically shut off) when the hatch is opened. Also, in the case where the opening-closing unit 31 is a lid, the connection units 33*a* and 33*b* have a structure whereby the power line 41 or the power line 41 and signal line 42 are separated when the lid is removed.

Operations of the unauthorized readout prevention mechanism will now be described.

Figure 2:
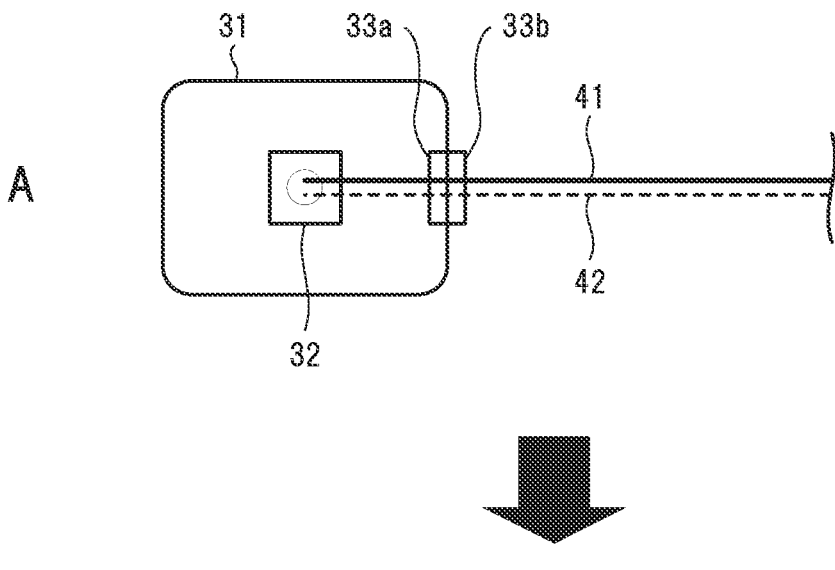
FIG. 2 is a diagram for describing operations of the unauthorized readout prevention mechanism.
Figure 2:
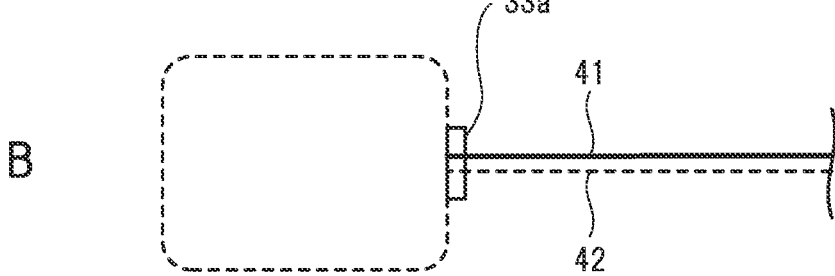

FIG. 2 is a diagram for describing operations of the unauthorized readout prevention mechanism. FIG. 2 is a diagram in which the opening-closing unit 31 is viewed from inside the casing 20. A in FIG. 2 shows the case where the opening-closing unit 31 is closed. B in FIG. 2 shows the case where the opening-closing unit 31 is open.

In A of FIG. 2, the opening-closing unit 31 is closed, and thus, under normal conditions, the power line 41 is electrically connected and power is supplied to inside the casing

20. In contrast, in B of FIG. 2, the opening-closing unit 31 is open, and thus the power line 41 is separated and power is no longer supplied to inside the casing 20. Note that the same can also be said for the signal line 42.

(First Modification)

Figure 3:
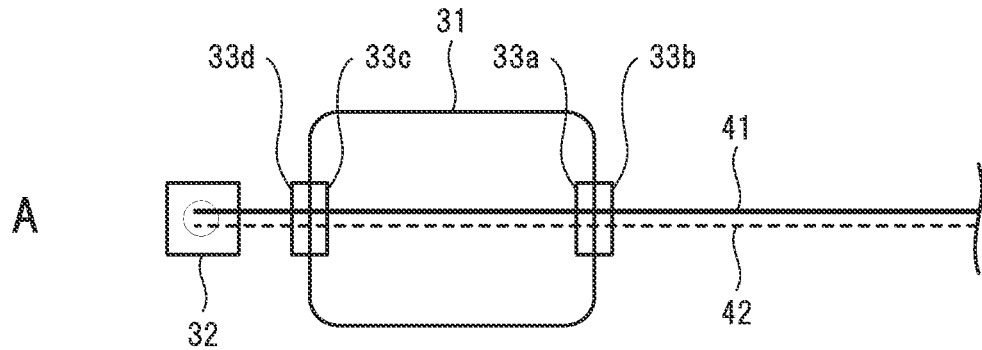
FIG. 3 is a diagram for describing operations of an unauthorized readout prevention mechanism of the first modification.
Figure 3:
Figure 3:
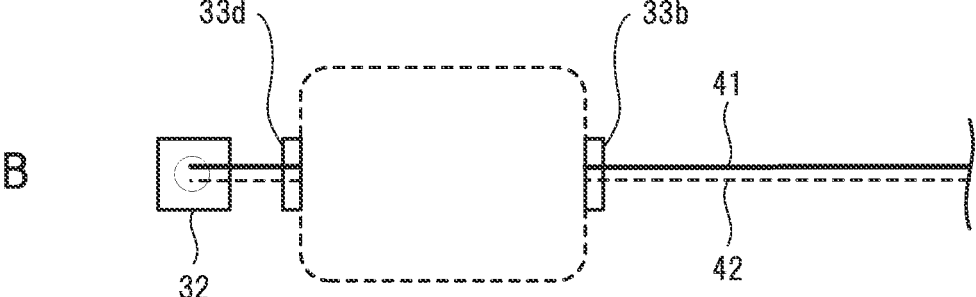

A first modification will be described using FIG. 3. FIG. 3 is a diagram for describing operations of an unauthorized readout prevention mechanism of the first modification. FIG. 3 is a diagram in which the opening-closing unit 31 is viewed from inside the casing 20. In the first modification, as shown in FIG. 3, a connector 32 (access hole) is provided in the casing 20. In that case, as shown in FIG. 3, the opening-closing unit 31 is provided with two switches 33. A first switch in FIG. 3 is constituted by a connection unit 33*a* (first connection unit) and a connection 10) unit 33*b* (second connection unit). Also, a second switch of FIG. 3 is constituted by a connection unit 33*c* (third connection unit) and a connection unit 33*d* (fourth connection unit).

In the first modification, when the opening-closing unit 31 is opened, the connection between the connection unit 33*a* and the connection unit 33*b* and the connection between the connection unit 33*c* and the connection unit 33*d* are separated. Accordingly, the power line 41 or the power line 41 and the signal line 42 are separated.

Specifically, in A of FIG. 3, the opening-closing unit 31 is closed, and thus, under normal conditions, the power line 41 is electrically connected and power is supplied to inside the casing 20. In contrast, in B of FIG. 3, the opening-closing unit 31 is open, and thus the power line 41 is separated and power is no longer supplied to inside the casing 20. Note that the signal line 42 is also similarly separated.

(Second Modification)

Figure 4:
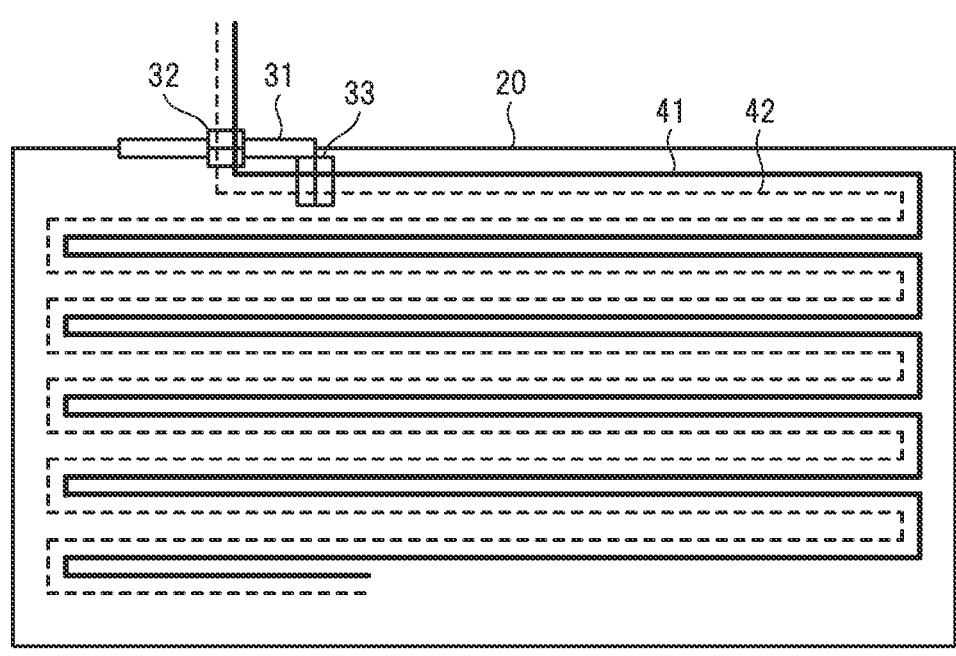
FIG. 4 is a diagram for describing operations of an unauthorized readout prevention mechanism of the second modification.

A second modification will be described using FIG. 4. FIG. 4 is a diagram for describing operations of an unauthorized readout prevention mechanism of the second modification.

In the second modification, a configuration is adopted in which the power line 4 or the power line 41 and the signal line 42 are separated in the event of a hole being opened in the casing 20. Specifically, as shown in FIG. 4, the power line 41 or the power line 41 and the signal line 42 have multiple bends, and the power line 41 is wired to cover the inner surface of the casing 20. By adopting this configuration, the power line 41 or the power line 41 and the signal line 42 are readily separated in the event of a hole being opened in the casing 20. Note that the power line 41 and the signal line 42 may be passed through a flexible tube or the like.

(Third Modification)

Figure 5:
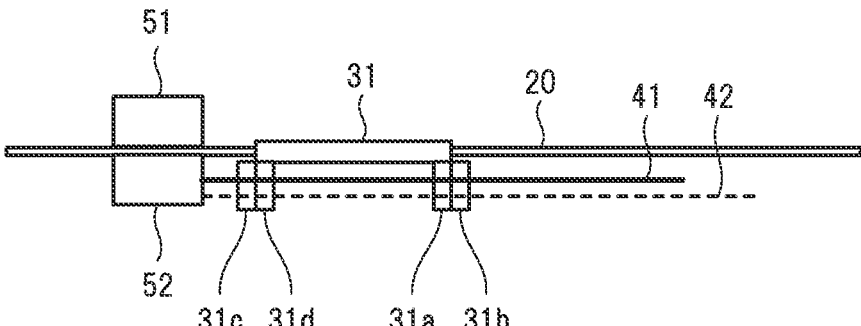
FIG. 5 is a diagram for describing operations of an unauthorized readout prevention mechanism of the third modification.

A third modification will be described using FIG. 5. FIG. 5 is a diagram for describing operations of an unauthorized readout prevention mechanism of the third modification.

In the third modification, power or power and signals may be supplied to inside the casing 20 wirelessly, without opening a hole in the casing 20. Specifically, as shown in FIG. 5, power or power and signals are supplied to inside the casing 20, using wireless transmission/reception units 51 and 52.

(Fourth Modification)

In a fourth modification, circuit information that is not highly confidential is disposed in a nonvolatile region. Similarly, programs (software) that are not highly confidential are also disposed in a nonvolatile region. Furthermore, data that is not highly confidential may also be disposed in a nonvolatile region.

The nonvolatile region is, for example, a storage device or memory such as a hard disk, SSD (Solid-State Drive) or ROM (Read-Only Memory).

Circuit information that is not highly confidential is conceivably information relating to a circuit that simply performs addition, for example. Also, a program that is not highly confidential is conceivably standardized middleware such as a commercially available OS or CORBA (Common Object Request Broker Architecture), for example. Furthermore, data that is not highly confidential is conceivably a commercially available map, for example.

Also, it is conceivable for a function (circuit information, programs, data) for returning to a safe region such as home territory with minimal processing and control in the event of a failure or an unexpected power interruption to be stored in a nonvolatile region, for example.

Furthermore, it is conceivable, for example, to store, in a nonvolatile region, a function (circuit information, programs, data) that determines, using sensing data obtained from the sensor unit 14 (camera, etc.) and from events before and after the power interruption, that the unmanned vehicle 1 has not been seized and a power interruption due to a temporary glitch has occurred, and that is able to download circuit information, programs (software) and data necessary for recovery from the base or the like if it becomes clear that a power interruption due to a temporary glitch has occurred.

Also, the determination that the unmanned vehicle 1 has not been seized and a power interruption due to a temporary glitch has occurred is performed based on unexpected changes in altitude, changes in depth, changes in speed or the like. Alternatively, this determination may be performed based on the surrounding environment, using artificial intelligence (AI) or the like. Furthermore, a mechanism may be provided that automatically interrupts power if it is determined that the unmanned vehicle 1 has been seized.

(Fifth Modification)

Figure 6:
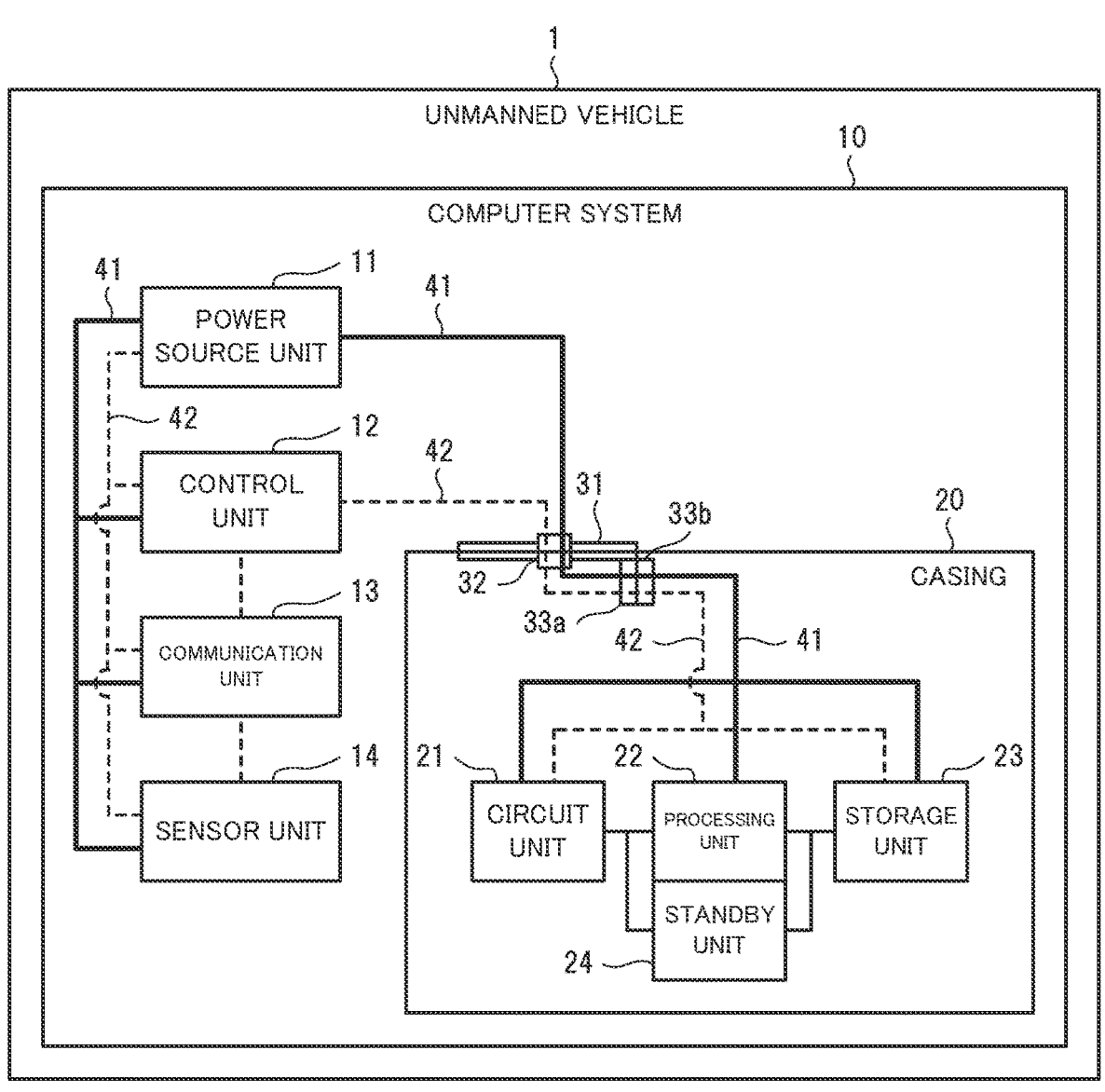
FIG. 6 is a diagram for describing operations of an unauthorized readout prevention mechanism of the fifth modification.

A fifth modification will be described using FIG. 6. FIG. 6 is a diagram for describing operations of an unauthorized readout prevention mechanism of the fifth modification.

In the fifth modification, information processing such as signal processing that is performed by the unmanned vehicle 1 is advanced processing, and thus power consumption of the processing unit 22 is high. In view of this, the processing unit 22 is usually kept in a sleep state or with power thereto interrupted, and is started when necessary.

Programs (software) of the processing unit 22 are stored in the storage unit 23, and transferred to the processing unit 22 after the processing unit 22 starts up.

Note that, as shown in FIG. 6, a standby unit 24 for starting the processing unit 22 may be provided. The standby unit 24 is a computer constituted by a CPU, a DRAM or the like, for example. The standby unit 24 has lower power consumption than the processing unit 22. Also, the standby unit 24 may have lower power consumption than the circuit unit 21 and the storage unit 23.

Programs (software) of the standby unit 24 are stored in a volatile region, and when power is no longer supplied, the programs of the standby unit 24 stored in the volatile region are also lost. Information with low confidentiality may, however, be stored in a nonvolatile region.

(Sixth Modification)

Figure 7:
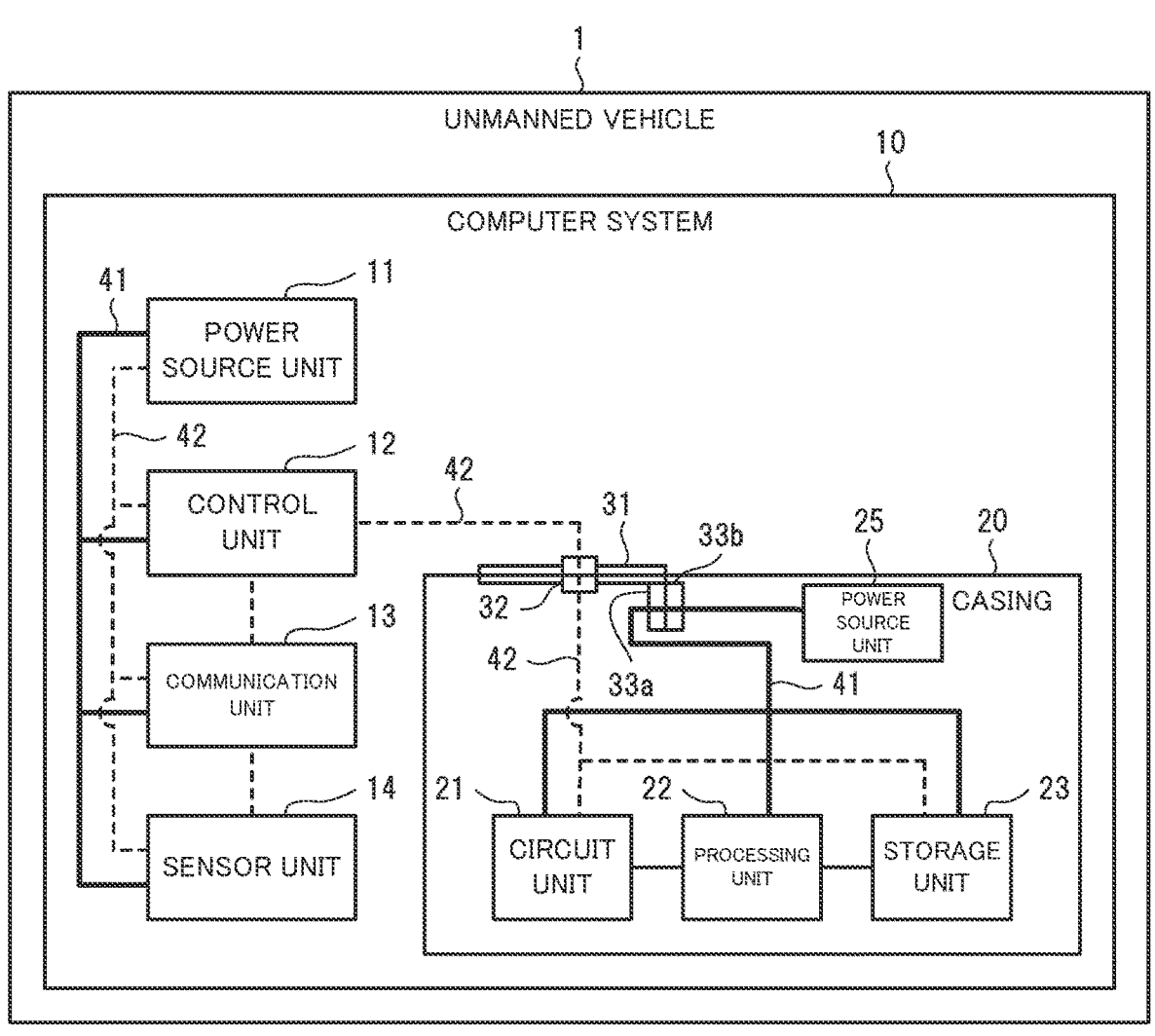
FIG. 7 is a diagram for describing operations of an unauthorized readout prevention mechanism of the sixth modification.

A sixth modification will be described using FIG. 7. FIG. 7 is a diagram for describing operations of an unauthorized readout prevention mechanism of the sixth modification.

In the sixth modification, as shown in FIG. 7, a power source unit 25 is provided inside the casing 20 separately to that outside of the casing 20. The power source unit 25 inside the casing 20 is also a battery, a generator or the like, similarly to the power source unit 11. Also, the circuit unit 21, the processing unit 22 and the storage unit 23 inside the casing 20 are supplied with power from the power source unit 25. A mechanism is, however, provided that interrupts power when the opening-closing unit 31 is opened.

In the example of FIG. 7, when the opening-closing unit 31 is opened, the connection unit 33a and the connection unit 33b of the switch 33 are physically separated (disconnected), and the power line 41 inside the casing 20 is no longer electrically connected (power is no longer supplied from the power source unit 25). Note that a mechanism for separating the signal line 42 may also be provided.

Accordingly, because power is interrupted, the circuit information necessary in order to construct the circuit unit 21, which is stored in the SRAM (volatile memory) of the circuit unit 21, is lost. Also, due to the power interruption, the programs that are used by the processing unit 22, which are stored in the DRAM (volatile memory) of the processing unit 22, are also lost. Furthermore, the data stored in the DRAM and SRAM of the storage unit 23 is also lost.

Note that, due to the provision of the power source unit 25, processing can be executed even if the power source unit 11 fails. Also, since the power line 41 does not need to be drawn from the power source unit 11, the size of the access hole joining the outside of the casing 20 and the inside of the casing 20 can be minimized. Also, an access hole is not provided, and communication between the outside of the casing 20 and the inside of the casing 20 may only be performed wirelessly.

Effects of Embodiment

According to the embodiment and the first to sixth modifications as described above, circuit information, programs (software) and data of the unmanned vehicle 1 are stored in a volatile region, and thus power is interrupted when the opening-closing unit 31 of the casing 20 is opened due to the impact at the time that the unmanned vehicle 1 is seized. As a result, the circuit information, programs (software) and data are erased, and thus cannot be stolen by an unexpected third party.

According to the above description, data, programs and circuit information can be erased from a computer system installed in an unmanned vehicle and extraction thereof can be prevented. Also, the mechanism described above is useful in fields utilizing unmanned vehicles.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An unauthorized readout prevention mechanism comprising:

a power source unit provided outside of a casing provided in an unmanned vehicle;

a power line configured to supply power from the power source unit to a volatile region inside the casing;

an opening-closing unit provided in the casing; and a switch configured to physically separate the power line and shut off supply of power to inside the casing when the opening-closing unit is opened, wherein the switch is further configured to physically separate a signal line inserted inside the casing from outside the casing, wherein the switch is connected to:

a circuit unit constructed using circuit information, a processing unit for performing processing using a program, and a storage unit storing data, and wherein the circuit information, the program and the data are stored in the volatile region.

2. The unauthorized readout prevention mechanism according to claim 1, wherein the opening-closing unit has a hole for inserting the power line or the power line and the signal line, a first connection unit constituting the switch is connected to the opening-closing unit, and a second connection unit constituting the switch is connected to the inside of the casing, and when the opening-closing unit is opened, the first connection unit and the second connection unit are separated and supply of power to inside the casing is shut off.

3. The unauthorized readout prevention mechanism according to claim 1, wherein the casing has a hole for inserting the power line or the power line and the signal line, the opening-closing unit is provided with a first switch and a second switch, a first connection unit constituting the first switch is connected to the opening-closing unit, and a second connection unit constituting the first switch is connected to the inside of the casing, a third connection unit constituting the second switch is connected to the opening-closing unit, and a fourth connection unit constituting the second switch is connected to the outside of the casing, and when the opening-closing unit is opened, the first connection unit and the second connection unit are separated and the third connection unit and the fourth connection unit are separated, and supply of power to inside the casing is shut off.

4. An unmanned vehicle housing a casing, comprising:

a power source unit provided outside of the casing;

a power line configured to supply power from the power source unit to a volatile region inside the casing;

an opening-closing unit provided in the casing; and a switch configured to physically separate the power line and shut off supply of power to inside the casing when the opening-closing unit is opened, wherein the switch is further configured to physically separate a signal line inserted inside the casing from outside the casing, wherein the switch is connected to:

a circuit unit constructed using circuit information, a processing unit for performing processing using a program, and a storage unit storing data, and wherein the circuit information, the program and the data are stored in the volatile region.

5. The unmanned vehicle according to claim 4, wherein the opening-closing unit has a hole for inserting the power line or the power line and the signal line, a first connection unit constituting the switch is connected to the opening-closing unit, and a second connection unit constituting the switch is connected to the inside of the casing, and when the opening-closing unit is opened, the first connection unit and the second connection unit are separated and supply of power to inside the casing is shut off.

6. The unmanned vehicle according to claim 4, wherein the casing has a hole for inserting the power line or the power line and the signal line, the opening-closing unit is provided with a first switch and a second switch, a first connection unit constituting the first switch is connected to the opening-closing unit, and a second connection unit constituting the first switch is connected to the inside of the casing, a third connection unit constituting the second switch is connected to the opening-closing unit, and a fourth connection unit constituting the second switch is connected to the outside of the casing, and when the opening-closing unit is opened, the first connection unit and the second connection unit are separated and the third connection unit and the fourth connection unit are separated, and supply of power to inside the casing is shut off.

7. The unauthorized readout prevention mechanism according to claim 1, wherein the power line is configured with multiple bends, and the power line and the signal line are wired to cover an inner surface of the casing.

8. The unauthorized readout prevention mechanism according to claim 1, wherein the power line and the signal line are configured with multiple bends, and the power line and the signal line are wired to cover an inner surface of the casing.

9. The unmanned vehicle according to claim 4, wherein the power line is configured with multiple bends, and the power line and the signal line are wired to cover an inner surface of the casing.

10. The unmanned vehicle according to claim 4, wherein the power line and the signal line are configured with multiple bends, and the power line and the signal line are wired to cover an inner surface of the casing.

\* \* \* \* \*